United States Patent [19]

Yukawa

[11] 4,132,208
[45] Jan. 2, 1979

[54] IGNITION SYSTEM FOR AN INTERNAL COMBUSTION ENGINE

[75] Inventor: Hideki Yukawa, Susono, Japan

[73] Assignee: Kokusan Denki Co., Ltd., Numazu, Japan

[21] Appl. No.: 814,298

[22] Filed: Jul. 11, 1977

[30] Foreign Application Priority Data

Jul. 19, 1976 [JP] Japan .................................. 51-85796
Aug. 5, 1976 [JP] Japan .................................. 51-93315

[51] Int. Cl.² .............................................. F02D 5/04
[52] U.S. Cl. ........................ 123/148 CC; 123/149 C; 315/209 SC
[58] Field of Search ........ 123/148 CC, 148 E, 149 R, 123/149 A, 149 C, 149 FA; 310/70 A; 315/209 CD, 209 SC, 218

[56] References Cited

U.S. PATENT DOCUMENTS

| 4,010,726 | 3/1977 | Kondo et al. ................. 123/148 CC |
| 4,075,989 | 2/1978 | Nagasawa ................. 123/148 CC X |
| 4,079,712 | 3/1978 | Nagasawa ..................... 123/148 CC |

Primary Examiner—Charles J. Myhre
Assistant Examiner—Tony M. Argenbright
Attorney, Agent, or Firm—Woodling, Krost, Granger & Rust

[57] ABSTRACT

An ignition system for an internal combustion engine wherein ignition timing is retarded when the engine speed exceeds a predetermined value. The ignition angle retardation is effected by an angle retarding circuit for by-passing at least part of an AC ignition signal. The angle retarding circuit is actuated responsive to an output of a phase-advanced signal generating circuit for generating an AC signal in advance in phase of the ignition signal. The utilization of the phase-advanced signal generating circuit enables the ignition angle to be varied over a wide angle.

15 Claims, 26 Drawing Figures

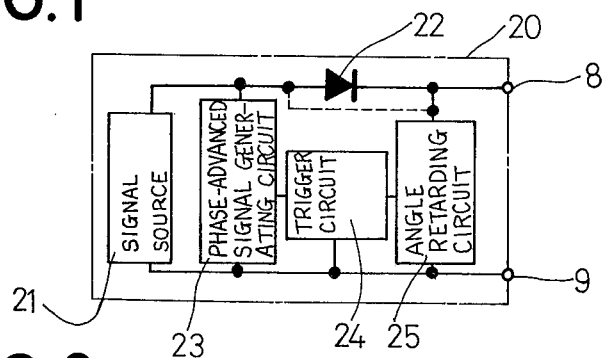
FIG.1
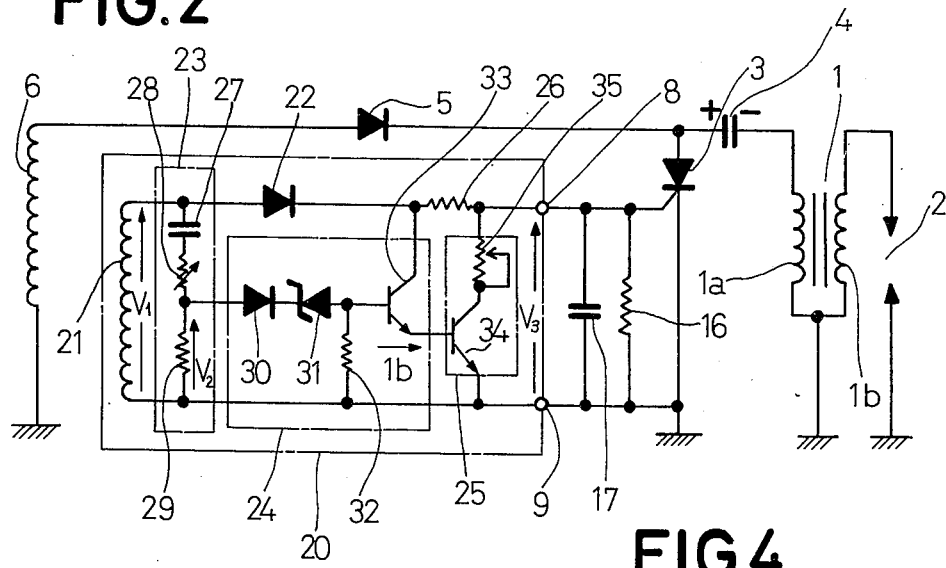
FIG.2
FIG.3
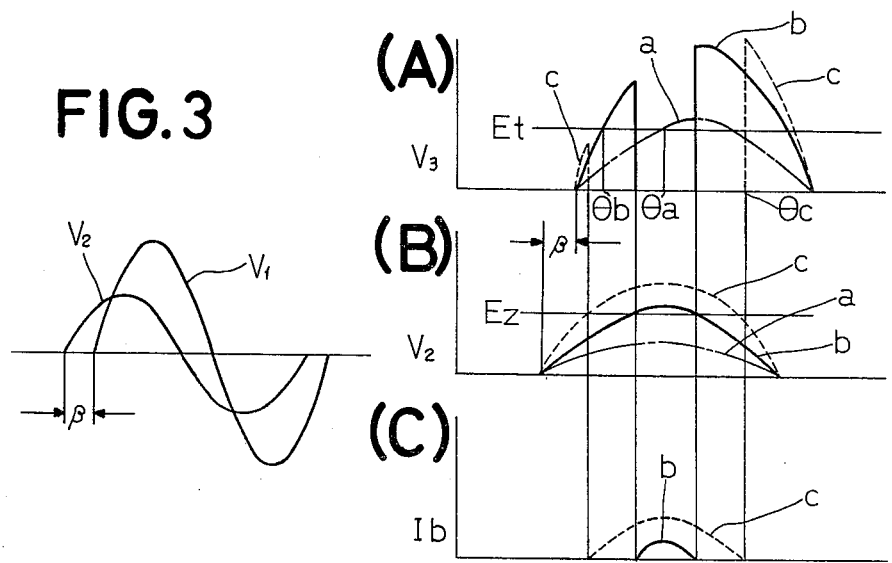
FIG.4

(A)

(B)

IGNITION SYSTEM FOR AN INTERNAL COMBUSTION ENGINE

BACKGROUND OF THE INVENTION

The present invention relates to a breakerless ignition system for an internal combustion engine wherein a semiconductor switch is adapted to suddenly change the primary current of an ignition coil, thereby inducing a high voltage in the secondary.

It is a general practice to advance the ignition angle of an internal combustion engine as the rotational speed of the engine is increased. But, it is sometimes desirable to retard the ignition angle when the engine speed exceeds a certain value. For instance, it may be desirable that the ignition angle of a four-cycle engine is substantially retarded when the engine speed exceeds a predetermined value so that overrunning of the engine is prevented. It may also be desirable that the ignition angle of a two-cycle engine is substantially retarded above a certain engine speed in order to increase the engine output power. A conventional ignition system adapted to meet the aforesaid requirement comprises a signal coil producing an AC signal whose positive half is applied to a semiconductor switch adapted to be turned on to conduct the primary current of an ignition coil and means for short-circuiting the negative half of the AC signal, when the engine speed exceeds a predetermined value, to retard commencement of the positive half cycle of the AC signal. Another conventional ignition system comprises an AC signal source similar to the above-mentioned one and means for bypassing part of the positive half of the AC signal to reduce the magnitude of the signal, when the engine speed exceeds a predetermined value, so that the instantaneous value of the AC signal is made to lag in reaching a level sufficient to turn on the semiconductor switch. These conventional systems are however unsatisfactory because the "angle of lag" obtained is insufficient for some applications.

SUMMARY OF THE INVENTION

It is an object of the present invention to provide an ignition system for an internal combustion engine with which the amount of angle of lag can be enlarged.

An ignition system according to the present invention comprises an ignition coil including a primary winding and a secondary winding, a semiconductor switch for controlling the primary current of the ignition coil, and a signal source for generating an AC ignition signal in synchronism with the rotation of the engine, the AC ignition signal being supplied to a control terminal of the semiconductor switch to control the semiconductor switch. The invention is characterized by further comprising an angle retarding circuit for retarding application of the ignition signal from the signal source to the control terminal of the semiconductor switch. The angle retarding circuit may for instance comprise a semiconductor switching device adapted to by-pass at least part of the ignition signal until such time that ignition is desired. The angle retarding circuit may alternatively comprise a pair of unidirectional switching devices, one of which is adapted to short-circuit the negative half of the AC output of the signal source to retard commencement of the subsequent positive half cycle, and the other unidirectional switching device is adapted to reduce, by a certain proportion, the magnitude of the instantaneous value of the AC signal as applied to the control terminal of the semiconductor switch, so that the instantaneous value of the AC signal reaches a level sufficient to turn on the semiconductor switch at a later time so that the turn-on of the semiconductor switch and hence the ignition of the engine are retarded. Other variations of the angle retarding circuits will be described with reference to the drawings. The aforesaid operation of the angle retarding circuit occurs when the engine speed exceeds a predetermined value. To initiate operation of the angle retarding circuit, a trigger signal is provided to supply a trigger signal to the angle retarding circuit when the engine speed exceeds a predetermined value. A phase-advanced signal generating circuit is also provided to generate an AC signal having a phase in advance of the ignition signal from the signal source. The output of the phase-advanced signal generating circuit is supplied to the above-mentioned trigger circuit. The trigger circuit may for instance be constructed to produce a trigger signal when the instantaneous value of the output of the phase-advanced signal generating circuit reaches a predetermined level.

Use of the phase-advanced signal generating circuit makes it possible to expand the angle of lag, and adjustment of the phase difference between the output of the signal source and output of the phase-advanced signal generating circuit enables simple setting of the engine speed above which the angle retarding operation is effected. Moreover, where a pair of unidirectional switches are employed to form the angle retarding circuit, the angle of lag can be further increased.

BRIEF DESCRIPTION OF THE DRAWINGS

Other features and advantages of the present invention will be apparent from the following detailed description of the invention taken in conjunction with the accompanying drawings in which;

FIG. 1 shows a block diagram illustrative of a general construction of an ignition angle control circuit which may be incorporated in an ignition system of the invention, FIG. 2 shows a circuit diagram of an embodiment of the invention, FIG. 3 shows waveforms of voltages $V_1$ and $V_2$ indicated in FIG. 2, FIGS. 4(A) through (C) show waveforms of voltages and a current illustrative of operation of the system of FIG. 2.

DETAILED DESCRIPTION OF THE PREFERRED EMBODIMENTS

Figure 5:
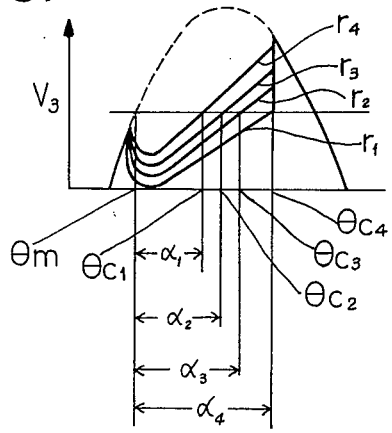
FIG. 5 shows waveforms of voltage $V_3$ indicated in FIG. 2, FIGS. 6(A) and (B) show advance angle characteristics for different values of resistance.

In general, a breakerless ignition system for an internal combustion engine employs an arrangement wherein the primary current of an ignition coil is suddenly changed by means of a semiconductor switch such as a thyristor or a transistor. To cause a sudden change in the primary current, various circuitries have been devised. In one type of circuitry, a primary current having been flowing through the primary winding of an ignition coil is interrupted by turn-off of a semiconductor switch connected in series with the primary winding. In another type, a semiconductor switch having been conducting to short-circuit an exciter coil is turned off so that a high voltage induced in the exciter coil is applied to an ignition coil primary connected across the exciter coil. In a third type, a capacitor having been charged is discharged through a semiconductor switch and an ignition coil primary. The present invention is applicable to any of the above mentioned types of ignition systems. The last mentioned capacitor discharge type ignition system is taken up for exemplifying embodiments of the invention, and for illustrating the features of the invention, but it should not be construed that the invention is limited to capacitor discharge type ignition systems.

Referring now more particularly to FIG. 1, there is shown a general construction of an ignition angle control circuit 20 which is utilized in an ignition system of the invention. The ignition angle control circuit comprises a signal source 21 for generating an AC ignition signal in synchronism with the rotation of the engine. One of the output terminals of the signal source 21 is connected through a diode 22 to a first terminal 8 of the control circuit 20 and the other terminal of the signal source 21 is directly connected to a second terminal 9 of the control circuit. The control circuit 20 also comprises a phase-advanced signal generating circuit 23 for generating an AC signal in advance in phase of the output voltage of the signal source 21, and a trigger circuit 24 for generating a control signal responsive to the output of the phase-advanced signal generating circuit. The control circuit 20 further comprises an angle retarding circuit 25 adapted to retard appearance of the ignition signal from the signal source 21 at the terminals 8 and 9. The angle retarding circuit 25 operates in response to the output of the trigger circuit 24. The phase-advanced signal generating circuit 23 may comprise a phase advancing circuit for advancing the phase of the AC output of the signal source. The phase-advanced signal generating circuit 23 may alternatively comprise a separate signal generator which is capable of inducing a signal having a phase in advance of the AC output of the signal source 21.

The angle retarding circuit may be connected across the terminals 8 and 9 as indicated by a solid line, or it may alternatively be connected across the output terminals of the signal source 21 as indicated by broken lines.

FIG. 2 shows an embodiment of an ignition system of the invention, which comprises an ignition coil 1 including a primary winding 1a and a secondary winding 1b across which an ignition plug 2 is shown to be connected. The ignition system further comprise a thyristor 3 serving as a semiconductor switch for discharging a capacitor 4 through the primary winding 1a. The capacitor 4 and the primary winding form a series circuit, which is connected through a diode 5 across an exciter coil 6. The exciter coil 6 may be a generating winding provided in a magneto generator whose rotor is mounted on the crank shaft of the engine, and therefore producing an output in synchronism with the rotation of the engine. The positive half of the output of the exciter 6 is utilized to charge the capacitor 4 into a polarity indicated by "+" and "−." The capacitor 4 is discharged when the semiconductor switch 3 is turned on, to cause a sudden increase in the primary current. The semiconductor switch 3 is triggered by an ignition angle control circuit 20, a specific example of which is shown to illustrate the features of the invention.

The signal source 21 of this ignition angle control circuit 20 is shown to be a signal coil adapted to generate an AC signal in synchronism with the rotation of the engine. The signal coil 21 may be provided in the magneto generator in which the exciter coil 6 is also provided.

The AC output $V_1$ of the signal coil 21 is supplied through a diode 22 and a resistor 26 in series with the diode 22 across the terminals 8 and 9, namely across the gate and cathode of the thyristor 3.

The phase-advanced signal generating circuit 23 of the embodiment illustrated comprises a series circuit of a capacitor 27, a variable resistor 28 and a resistor 29, the series circuit being connected across the signal coil 21. The phase-advanced AC output $V_2$ is taken out across the resistor 29.

The trigger circuit signal 24 of the embodiment comprises a diode 30 having its anode connected to a first end of the resistor 29 coupled to the resistor 28, a Zener diode 31 having its cathode connected to the cathode of the diode 30, a resistor 32 connected across the anode of the Zener diode 31 and the second end of the resistor 29, and a transistor having its base connected to the anode of the Zener diode 31 and having its collector connected to the cathode of the diode 22 whose anode is connected to one end of the signal coil 21.

The angle retarding circuit 25 of the present embodiment comprises a transistor 34 having its base connected to the emitter of the transistor 33, having its emitter connected to the terminal 9, and having its collector connected through a variable resistor 35 to the terminal 8.

In operation the signal voltage $V_2$ across the resistor 29 has a phase in advance of the output $V_1$ of the signal coil 21 by an angle $\beta$ as shown in FIG. 3. The angle $\beta$ can be adjusted within the range of from 0° to 90° by properly selecting the capacitor 27 and the resistors 28 and 29, minute adjustment being accomplished by the variable resistor 28.

FIGS. 4(A) through (C) show the waveforms of the voltage $V_3$ across the gate and cathode of the thyristor 3, the voltage $V_2$ across the resistor 29 and the base current Ib of the transistor 34, when the resistance of the variable resistor in series with the transistor 34 is set at zero.

The curves a, b and c respectively show the waveforms when the rotational speed of the engine is at $n_1$, $n_2$ and $n_3$ ($n_1 < n_2 < n_3$). While the engine speed is low such as at $n_1$, the voltage $V_2$ does not reach the Zener voltage Ez of the Zener diode 31, so that the transistor 33 does not conduct. The transistor 34 therefore remains non-conductive, and the output of the signal coil 21 is supplied through the diode 22 and the resistor 26 across the gate and cathode of the thyristor 3. As can be seen in FIG. 4(A), the voltage $V_3$ reaches the gate trigger level Et at an angle $\theta a$, the thyristor 3 being forward biased by the capacitor 4 is turned on, so that a discharging current flows through the primary winding 1a, which in turns induces a high voltage in the secondary and a spark at the ignition plug 2.

As the engine speed is increased to $n_2$, the voltage $V_2$ shown by the curve b exceeds the Zener voltage Ez, so that the transistors 33 and 34 conduct. But, before the transistors conduct, the voltage $V_3$ reaches the gate trigger level Et at an angle $\theta b$, so that ignition of the engine takes place at the angle $\theta b$.

As the engine speed is further increased to $n_3$, the voltage $V_2$ reaches the Zener voltage Ez to turn on the transistors, before the voltage $V_3$ reaches the gate trigger level Et. Conduction of the transistors makes the voltage $V_3$ fall to zero and remain at zero until the voltage $V_2$ falls below the Zener voltage Ez at an angle $\theta c$, when the transistors are turned off and the voltage $V_3$ recovers to trigger the thyristor 3. Accordingly, the ignition is effected at the angle $\theta c$. It will be observed that the ignition angle is retarded drastically, and the angle of this drastic retardation or lag is more than 90° (electrical angle). These results are attributable to the unique arrangement of the invention, and particularly to phase-advanced signal generating circuit.

Figure 6:
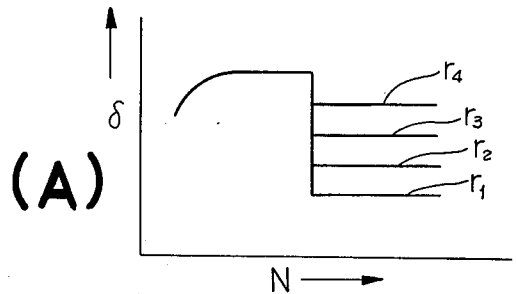

It has been assumed that the variable resistor 35 is set to zero resistance. It is noted that adjustment of the resistance of the variable resistor 35 enables free setting of angle of lag. Waveforms $r_1 \sim r_4$ shown in FIG. 5 represent the voltage $V_3$ when the variable resistor 35 is adjusted at $r_1 \sim r_4$ ($r_1 < r_2 < r_3 < r_4$), respectively, at a high engine speed as at $n_3$. The ignition angles $\theta c_1 \sim \theta c_4$ for the resistances $r_1 \sim r_4$ lag behind the most advanced ignition angle approximately at $\theta m$ by angles $\alpha_1 \sim \alpha_4$, respectively. The resultant characteristics of advance angle (angle difference between the ignition angle and the top dead center of the piston) in relation to the engine speed N are as the curves $r_1 \sim r_4$ shown in FIG. 6(A).

Figure 8:
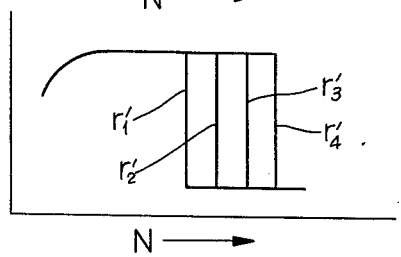
FIGS. 8(A) through (C) show waveforms of voltages illustrative of operation of an ignition system identical to that of FIG. 2 except replacement by the phase-advanced signal generating circuit of FIG. 7, FIGS. 9(A) and (B) show advance angle characteristics for different values of resistance of the last-mentioned ignition system.
Figure 8:
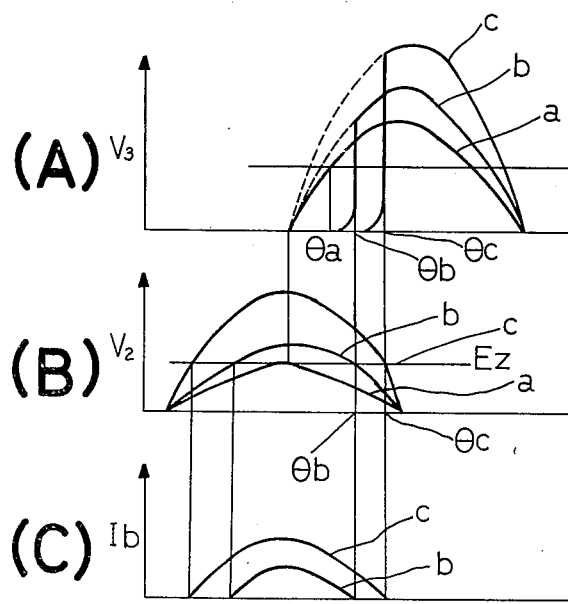

It is also noted that the engine speed above which angle retarding operation is effected can be varied by varying the resistance of the variable resistor 28. FIG. 8B shows the advance angle to engine speed characteristics $r_1' \sim r_4'$ ($r_1' < r_2' < r_3' < r_4'$) for various resistances $r_1' \sim r_4'$ of the variable resistor 28, with the variable resistor 35 at zero.

Figure 7:
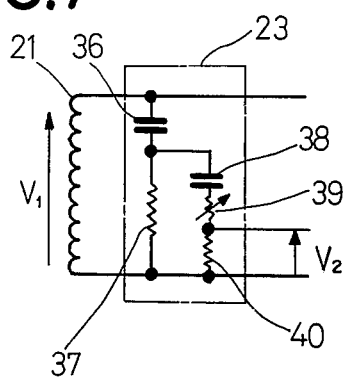
FIG. 7 shows a circuit diagram of a variation of phase-advanced signal generating circuit.

With the phase-advanced signal generating circuit of the aforesaid embodiment, the phase difference $\beta$ between the angles $V_2$ and $V_1$ is not more than 90°. FIG. 7 shows another example of a phase-advanced signal generating circuit which enables the voltage $V_2$ to lead the voltage $V_1$ by an angle more than 90°. To render such function, the phase-advanced signal generating circuit of FIG. 7 comprises a series circuit of a capacitor 36 and a resistor 37, the series circuit being connected across a signal coil similar to that of FIG. 2, and a second series circuit of a capacitor 38, a variable resistor 39 and a resistor 40, the second series circuit connected across the resistor 37, wherein the both ends of the resistor 40 form output terminals of the phase-advanced signal generating circuit.

Where the phase-advanced signal generating circuit of FIG. 7 is incorporated in the ignition system of FIG. 2, the voltages $V_3$ and $V_2$ and the base current Ib of the transistor 34 vary as shown by curves a~c in FIGS. 8(A) through (C), for different engines speeds $n_1 \sim n_3$ ($n_1 < n_2 < n_3$), assuming that the resistor 35 is set at zero resistance. With the engine speeds below $n_1$, the voltage $V_2$ does not reach the Zener voltage Ez, so that the ignition angle advances with increasing engine speed. Accordingly, ignition takes place when the voltage $V_3$ reaches the gate trigger level Et as at $\theta a$. As the engine speed is increased to $n_2$ the voltage $V_2$ exceeds the Zener voltage Ez before the positive half cycle of the e.m.f. of the signal coil 21 begins, so that the voltage $V_3$ remains zero until the voltage $V_2$ falls below the Zener voltage Ez at an angle $\theta b$, and ignition takes place at this angle. As the engine speed is further increased to $n_3$, the voltage $V_2$ falls below the Zener voltage Ez at a later angle $\theta c$.

Figure 9:
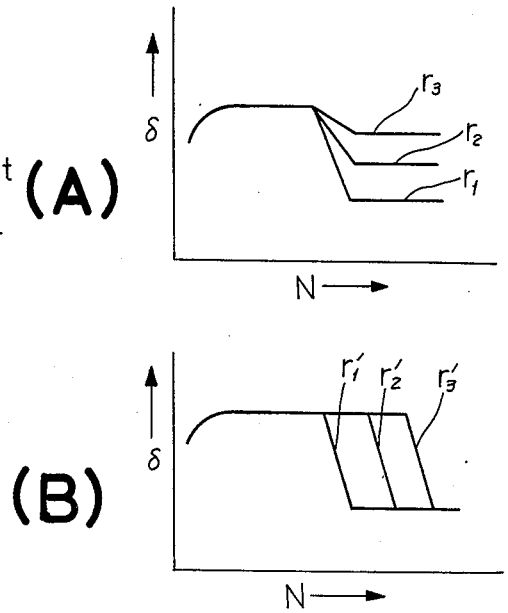

FIGS. 9(A) and (B) show the effects of varying the resistances r and r' of the variable resistors 35 and 39, with the phase difference $\beta$ being more than 90°. The curves $r_1 \sim r_3$ show advance angle $\delta$ relative to engine speed N for various resistances $r_1 \sim r_3$ ($r_1 < r_2 < r_3$) of the resistor 35. The curves $r_1' - r_3'$ show advance angle $\delta$ relative to engine speed N for various resistances $r_1' - r_3'$ ($r_1' < r_2' < r_3'$) of the resistor 39.

Figure 10:
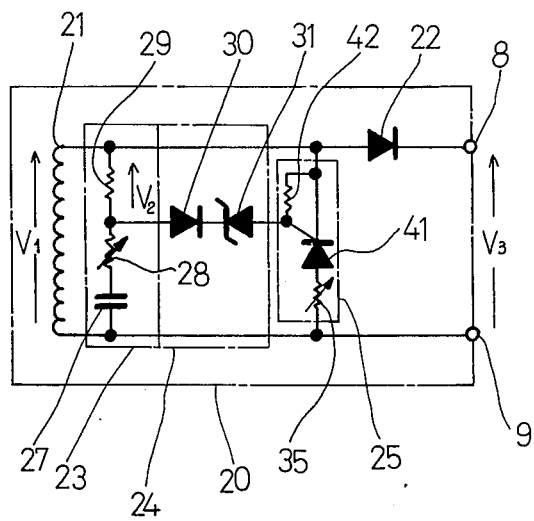
FIG. 10 shows a circuit diagram of a variation of an ignition angle control circuit.

In the embodiments described above, a transistor is employed in the angle retarding circuit 25, but as will be seen in FIG. 10, a thyristor may be used in substitution for the transistor. The thyristor denoted by numeral 41 in FIG. 10 is connected to conduct negative halves of the AC output of a signal coil similar to that of FIG. 2 so that the positive halves of the AC signal are retarded owing to armature reaction. To serve this function, the thyristor 41 has its cathode connected directly to one end of the signal coil 21 and has its anode connected through a variable resistor 35 to the other end of the signal coil. The phase-advanced signal generating circuit 23 of this embodiment comprises a series circuit of a capacitor 27, a variable resistor 28 and a resistor 29 positioned in the order reverse to that of FIG. 2. The output signal $V_2$ across the resistor 29 is reversely supplied through a series circuit of a diode 30 and a Zener diode 31 across the gate and cathode of the thyristor 41. A resistor 42 is connected across the gate and cathode of the thyristor 41.

Figure 11:
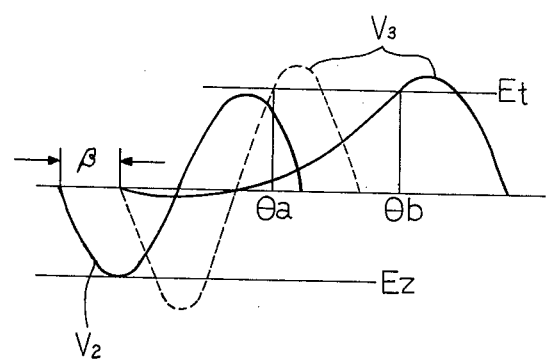
FIG. 11 shows waveforms of voltages illustrative of operation of the circuit of FIG. 10.
Figure 12:
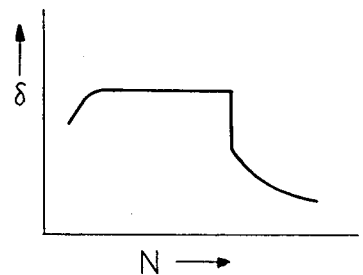
FIG. 12 shows an advance angle characteristic of an ignition system incorporating the circuit of FIG. 10.

In the ignition angle control circuit of FIG. 10, the voltage $V_2$ leads the voltages $V_1$ and $V_3$ by an angle $\beta$ by virtue of the phase-advanced signal generating circuit 23 as shown in FIG. 11, the thyristor 41 is turned on when the e.m.f. of the signal coil 21 is in its negative half cycle and when the voltage $V_2$ exceeds the Zener voltage Ez of the Zener diode 31 with the engine speed exceeding a certain level. Thus the thyristor 41 can be turned on throughout the whole period of the negative half cycle, so that the rise-up of the voltage $V_3$ is delayed to a great extent as indicated in a solid line. In comparison, the broken lines illustrate a waveform of the voltage $V_3$ if the thyristor 41 was kept non-conductive. The resultant advance angle to engine speed characteristic is shown in FIG. 12. It will be understood that the amount of angle retardation can be adjusted by the variable resistor 35, and that the engine speed above which the angle retardation is effected can be varied by the variable resistor 28.

Figure 13:
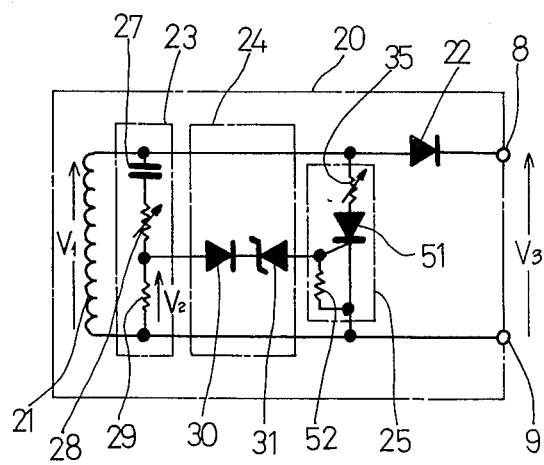
FIG. 13 shows a circuit diagram of a variation of an ignition angle control circuit, FIGS. 14(A) and (B) show waveforms of voltages illustrative of operation of the circuit of FIG. 13.
Figure 14:
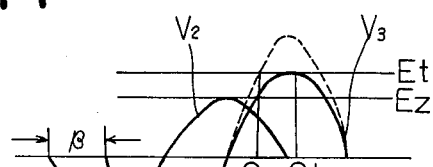
Figure 14:
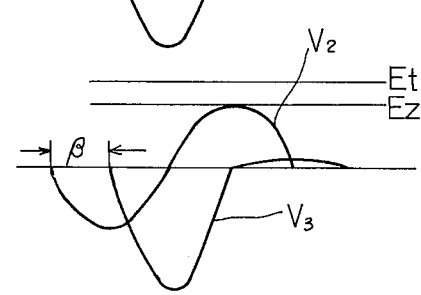

FIG. 13 shows another example of ignition angle control circuit, in which the positive output of the signal coil is partially by-passed so that the magnitude of the voltage $V_3$ is reduced by means of a thyristor 51 connected in the direction reverse to that of FIG. 10, and a variable resistor 35 connected in series with the thyristor 51. A resistor 52 is connected across the gate and cathode of the thyristor 51. The phase-advanced signal generating circuit 23 is similar to that of FIG. 2. The thyristor 52 is turned on when the voltage $V_3$ goes negative if at this time the voltage $V_2$ exceeds the Zener voltage Ez of the Zener diode 31, as shown in FIG. 14A. The current through the thyristor 51 increases the voltage drop in the signal coil 21, so that the waveform of the voltage $V_3$ becomes as indicated by the solid line rather than the broken lines. The result is that the angle at which the voltage $V_3$ reaches the gate trigger level Et is delayed from $\theta a$ to $\theta b$. The amount of angle retardation can be adjusted by the variable resistor 35 and the angle above which the angle retardation is effected can be adjusted by the variable resistor 28. The resultant advance angle characteristic is similar to those shown in FIGS. 6 and 11.

If the resistance of the variable resistor 35 is set to zero, the voltage $V_3$ will assume a very low value corresponding to a forward voltage drop of the thyristor 51, so that it will not reach the gate trigger level Et, and hence the thyristor 3 will not conduct. The result is failure of ignition, and the circuit 20 operates as an engine speed limitter.

Figure 15:
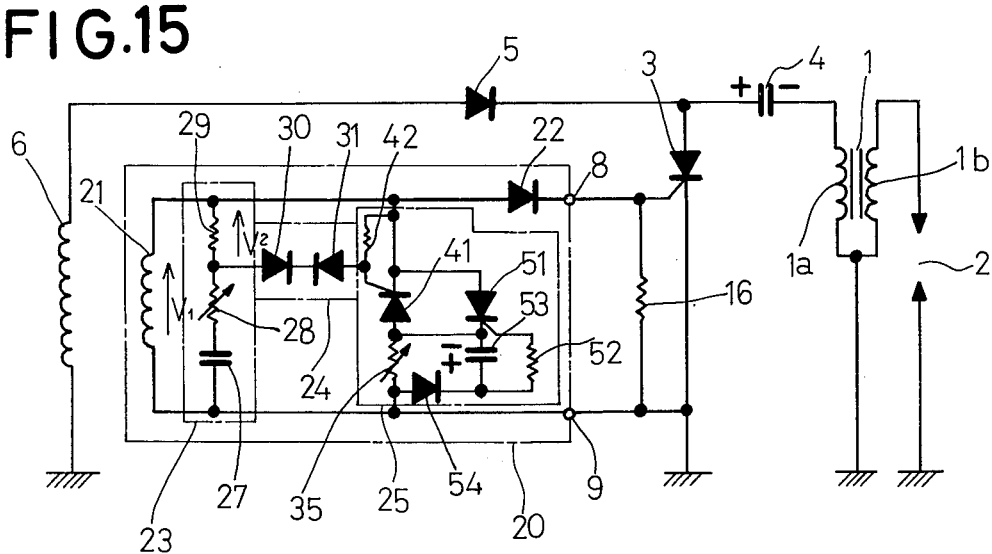
FIG. 15 shows a circuit diagram of another embodiment of the invention, FIGS. 16(A) and (B) show waveforms of the signals of the embodiment of FIG. 17.
Figure 16:
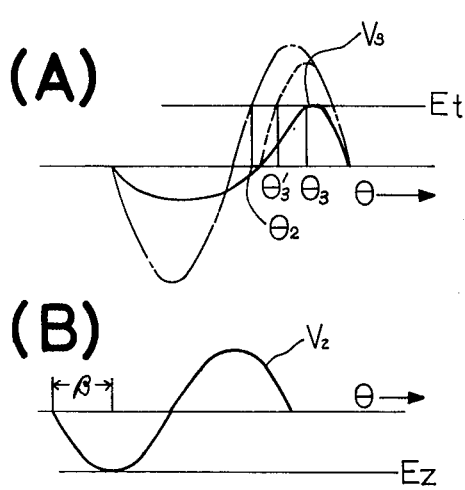

FIG. 15 shows another embodiment of the invention incorporating an ignition angle control circuit similar to that of FIG. 10 except the angle retarding circuit 25, which comprises a thyristor 41, a resistor 42, and a variable resistor 35 similar to those of FIG. 10 as well as a thyristor 51 having its anode connected to the cathode of the thyristor 41 and having its cathode connected to the anode of the thyristor 41, a capacitor 53 connected through a diode 54 across the variable resistor 35 so that the capacitor 53 is charged into the polarity indicated by "+" and "−" by the voltage drop across the variable resistor 35. The capacitor 53 is also connected across the gate and cathode of the thyristor 51 through a resistor 52 so that the voltage charged on the capacitor triggers the thyristor 51 when it is forward biased.

The operation during the negative half cycle of the voltage $V_3$ is substantially similar to that of FIG. 10. That is, as the engine speed exceeds a certain value, the voltage $V_2$ reaches the Zener voltage Ez and the thyristor 41 conducts which in turn prolongs the duration of the negative half of $V_3$ and delays the rise-up to positive. While the thyristor 41 is conducting, the capacitor 53 is charged by the voltage drop across the variable resistor 35. When the voltage $V_3$ goes positive the thyristor 41 is turned off, and the thyristor 51 is forward biased, with a gate signal supplied by the capacitor 53, so that the thyristor 51 is turned on. The effect of conduction of the thyristor is similar to those of FIG. 13. That is, the magnitude of the positive half of $V_3$ is reduced, so that the gate trigger level Et is reached at a later angle. As a result, the amount of angle retardation is greater than that of FIG. 10 or FIG. 13.

Figure 17:
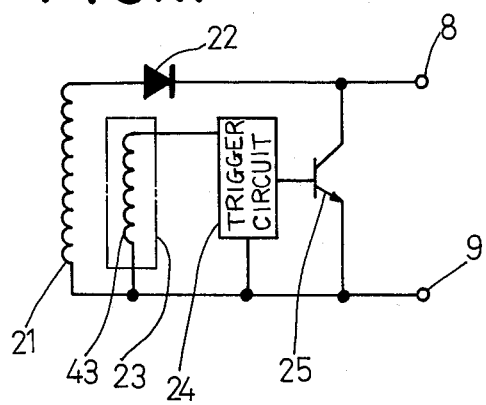
FIG. 17 shows a circuit diagram of a variation of an ignition angle control circuit.

FIG. 17 shows another example of ignition angle control circuit, in which a phase-advanced signal generating circuit 23 is shown to comprise a separate signal source 43 producing an output having a phase in advance of the output of the signal source 21. The signal source 43 may for instance comprise a signal coil provided in the common AC generator as the signal coil constituting of the signal source 21 and positioned at an angle in advance of the signal coil relative to the rotation of the generator.

Figure 18:
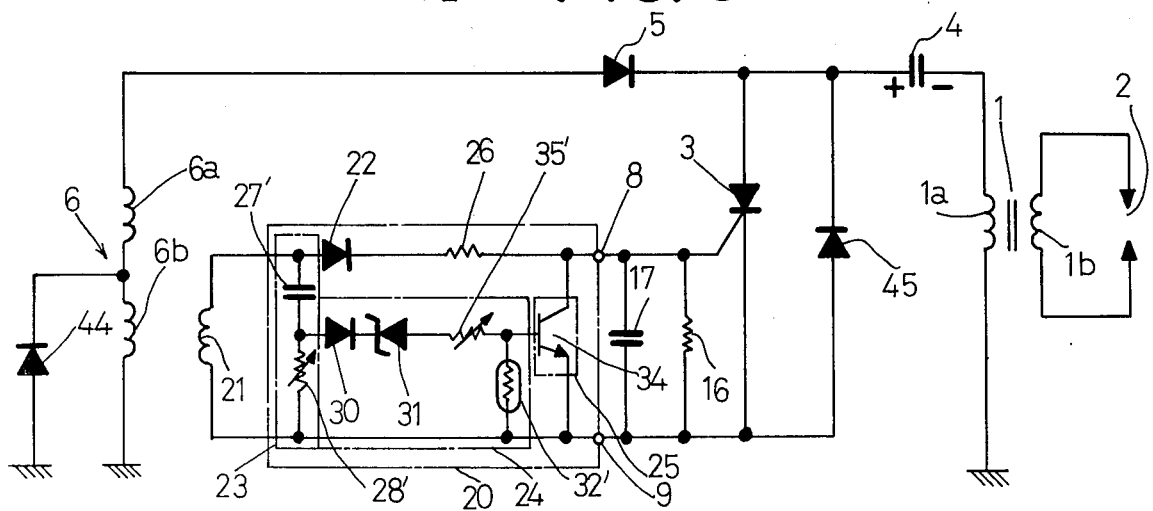
FIG. 18 shows a circuit diagram of still another embodiment of the invention.

FIG. 18 shows still another embodiment of an ignition system according to the invention, which is similar to that of FIG. 2 except as follows. The exciter coil 6 of this embodiment comprises a high speed exciter coil 6a with a relatively small number of turns and a low speed exciter coil 6b with a relatively large number of turns, connected in series with the high speed exciter coil 6a and having one end grounded in common with the cathode of the thyristor 3 and one end of the primary winding 1a of the ignition coil. A diode 44 is provided to have its anode grounded and its cathode connected to the junction between the coils 6a and 6b. A further diode 45 has its anode connected to the cathode of the thyristor 3 and its cathode to the anode of the thyrister 3. The exciter 6 of the aforesaid construction produces a sufficient output even at low engine speeds, so that the capacitor 4 is sufficiently charged, and sufficient spark energy is obtained. The negative half of the output of the exciter coil 6b is shorted by the diode 44, so that reverse voltage across the anode and cathode of the thyristor 3 is reduced and break-down thereof is prevented even at high engine speeds. The short-circuiting of a negative half output by the diode 44 also serves to reduce the magnitude of the subsequent positive half owing to armature reaction, the output of the exciter coil is prevented from being excessive at the high engine speeds. The diode 45 not only serves to protect the thyristor 3 from reverse over-voltage but also prolongs the oscillating current due to the capacitor 4 and the primary winding 1a of the ignition coil 1, with consequent extended duration of the secondary high voltage.

The phase-advanced signal generating circuit 23 of FIG. 18 comprises a series circuit of a capacitor 27' and a variable resistor 28' for setting the engine speed above which the angle retarding operation is effected. The voltage across the variable resistor 28' is applied through a diode 30, a Zener diode 31 and a variable resistor 35' across the base and emitter of a transistor 34. A thermister 32' is connected across the base and emitter of the transistor 34. The collector of the transistor 34 is directly connected to the terminal 8. The rest of the construction is similar to that of FIG. 2.

The operation of the ignition control circuit 20 of FIG. 18 is similar to that of FIG. 2, except that the resistors 35' and 28' are used to vary the amount of angle retardation and the engine speed above which the angle retarding operation is effected.

In the various embodiments described above, a thyristor is used as a semiconductor switch for controlling the primary current of the ignition coil. It is however noted that any type of semiconductor switch capable of on-off control may be employed, and a combination of a plurality of semiconductor elements may be used.

Similarly, the transistor or the thyristor used in an angle retarding circuit 25 may be replaced by any other type of switching device including a gate turn-off thyristor.

In the embodiments described, the signal output of the ignition angle control circuit 20 is directly supplied to the control terminal of the semiconductor switch 3 for controlling the primary current, but it will be understood that a wave-shaping circuit may be inserted to supply a pulsative signal to the control terminal of the semiconductor switch 3 when the output of the control circuit 20 reaches a predetermined "trigger level."

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. An ignition system for an internal combustion engine comprising an ignition coil,
   a semiconductor switch for controlling the primary current of said ignition coil,
   a signal source for supplying an AC signal to the control terminal of said semiconductor switch to control said semiconductor switch in synchronism with the rotation of the engine,
   characterized by further comprising an angle retarding circuit for retarding application of said AC signal from said signal source to said semiconductor switch,
   a phase-advanced signal generating circuit for generating an AC signal in advance in phase of the AC signal from said signal source, and a trigger circuit for providing a control signal to actuate said angle retarding circuit in response to the magnitude of the instantaneous value of said phase-advanced AC signal generated by said phase-advanced signal generating circuit.

2. An ignition system as set forth in claim 1, wherein said phase-advanced signal generating circuit comprises a series circuit of a capacitor and one or more resistors, said series circuit being connected across the output terminals of said signal source.

3. An ignition system as set forth in claim 2, wherein one of said resistors comprises a variable resistor.

4. An ignition system as set forth in claim 2 wherein said phase-advanced signal generating circuit further comprises a second series circuit of a capacitor and one or more resistors, said second series circuit being connected across one of said resistors of the first-mentioned series circuit.

5. An ignition system as set forth in claim 4, wherein one of said resistors of said second series circuit comprises a variable resistor.

6. An ignition system as set forth in claim 1, wherein said signal source comprises a signal coil provided in an AC generator rotating in synchronism with the engine, and said phase-advanced signal generating circuit comprises a second signal coil provided in the common generator and positioned at an angle in advance of the first-mentioned signal coil relative to the rotation of the AC generator.

7. An ignition system as set forth in claim 1, wherein said trigger circuit comprises a Zener diode adapted to conduct when the instantaneous value of the phase-advanced AC signal from said phase-advanced signal generating circuit exceeds the Zener voltage of said Zener diode.

8. An ignition system as set forth in claim 1, wherein said angle retarding circuit comprises a semiconductor switching device adapted to conduct when said Zener diode is conductive.

9. An ignition system as set forth in claim 1, wherein said angle retarding circuit comprises a semiconductor switching device adapted to by-pass at least part of said AC signal from said signal source until such time that ignition is desired.

10. An ignition system as set forth in claim 9, wherein said angle retarding circuit further comprises a variable resistor connected in series with said semiconductor switching device.

11. An ignition system as set forth in claim 1, wherein said angle retarding circuit comprises a semiconductor switching device adapted to by-pass at least part of said AC signal from said signal source to reduce the magnitude of said AC signal.

12. An ignition system as set forth in claim 11, wherein said angle retarding circuit further comprises a variable resistor connected in series with said semiconductor switching device.

13. An ignition system as set forth in claim 1, wherein said signal source comprises a signal coil provided in an AC generator rotating in synchronism with the engine.

14. An ignition system as set forth in claim 13, wherein said angle retarding circuit comprises a semiconductor switching device for by-passing at least part of the negative half of said AC signal from said signal coil, so that rise-up of the subsequent positive half is retarded, said positive half being effective to control said semiconductor switch for controlling the primary current of said ignition coil.

15. An ignition system as set forth in claim 14, wherein said angle retarding circuit further comprises a second semiconductor switching device for by-passing at least part of said positive half of said AC signal from said signal coil to reduce the magnitude of said AC signal.

* * * * *